2,957,838
HAIR SPRAY COMPOSITION CONTAINING LOWER ALKYL HALF ESTER OF AN ETHYLENE-MALEIC ANHYDRIDE COPOLYMER, ALCOHOL AND PROPELLANT AND PROCESS FOR MAKING

Charles L. Mills, Jr., Longmeadow, Mass., assignor to Monsanto Chemical Company, St. Louis, Mo., a corporation of Delaware No Drawing. Filed June 10, 1957, Ser. No. 664,498

6 Claims. (Cl. 260—28)

This invention relates to new compositions of matter. More particularly the invention relates to compositions containing film forming synthetic copolymers which are soluble in mild alkali and which are particularly useful for hair sprays.

Present hair sprays exhibit a variety of disadvantages in their use. Sprayed onto the hair, the present products often leave the hair coated with a tacky film which is shiny or lacquery in appearance. Other materials leave white flakes when the hair is combed. Still others are difficult to remove by washing.

One object of this invention is to provide new compositions of matter.

A further object is to provide compositions which when used as hair sprays possess the proper film forming and solubility properties to form a thin transparent non-shiny film which does not gel or become sticky in water and which is readily soluble in mild alkali and easily removed by washing.

These and other objects are attained by dissolving an alkyl ester of a copolymer of maleic anhydride and an olefin in an anhydrous aliphatic alcohol and pressurizing the solution with a gaseous propellant.

The following examples are given in illustration of this invention. Where parts are mentioned they are parts by weight.

Example I

Dissolve 1.5 parts of an ethyl half ester of a copolymer of ethylene and maleic anhydride having a molecular weight of about 25,000 in 30 parts of anhydrous ethanol. Place the solution in a suitable pressure container fitted with a spray nozzle and pressurize the solution with 70 parts of a 50–50 mixture of trichlorofluoro methane and dichlorodifluoro methane. When sprayed on newly waved human hair, a thin transparent non-glossy film forms which holds the wave in place. The treated hair may be combed repeatedly without any evidence of flaking. On washing with warm water and soap or conventional shampoo preparations, the film dissolves quickly and completely.

Other typical formulations are:

| | Parts |
|---|---|
| (A) Ethyl half ester of propylene-maleic anhydride copolymer—M.W. about 30,000 | 3 |
| Trichlorofluoromethane | 30 |
| Dichlorodifluoromethane | 30 |
| Anhydrous propanol | 40 |
| (B) Propyl half ester of ethylene-maleic-anhydride copolymer—M.W. about 30,000 | 1.5 |
| 1,2-dichloro-1,1,2,2-tetrafluoroethane | 40 |
| Trichlorofluoromethane | 20 |
| Anhydrous ethanol | 40 |
| (C) Methylisobutyl half ester of ethylene-maleic-anhydride copolymer—M.W. about 40,000 | 1 |
| Anhydrous ethanol | 40 |
| Dichlorodifluoromethane | 20 |
| 1,2-dichloro-1,1,2,2-tetrafluoroethane | 40 |

Because of wide variations in human hair with respect to diameter, brittleness, oiliness, etc., it is necessary to provide hair sprays having a variety of properties suitable for the different types of hair.

This is accomplished by incorporating in the sprays small amounts of plasticizer for the resin, small amounts of lanolin, small amounts of non-drying oils, etc. or mixtures thereof. A formulation effective for a wide range of hair conditions is as follows:

| | Parts |
|---|---|
| Ethyl half ester of ethylene-maleic-anhydride copolymer—M.W. about 25,000 | 1.5 |
| Butyl phthalyl butyl glycolate | 0.25 |
| Lanolin | 0.3 |
| Anhydrous ethanol | 30 |
| Trichlorofluoromethane | 35 |
| Dichlorodifluoromethane | 35 |

The resins of this invention are the half esters of copolymers of maleic anhydride with an olefin containing from 2 to 4 carbon atoms including ethylene, propylene, butylene or isobutylene. Under the usual polymerization conditions for forming the copolymers the olefin and maleic anhydride combine in equimolar proportions. Methods have been suggested which are at least partially effective in producing copolymers in which the mol ratio of olefin to maleic anhydride may be varied from 40:60 to 60:40. All of these copolymers are effective in hair sprays provided they have a molecular weight of from 25,000 to 70,000, provided they are fifty percent esterified with a saturate aliphatic alcohol containing from 1 to 4 carbon atoms and provided their half esters are soluble in anhydrous alcohols.

The esterification of the copolymers is a substantially spontaneous reaction if the half ester is desired. Merely dissolving the copolymer in an excess of the desired alcohol is sufficient. However, under these circumstances only the half ester is formed and any further esterification requires an acid catalyst and heat. Copolymers esterified up to 70% may be used provided the catalyst and water formed in the esterification reaction is removed. Since the solvent required for the sprays of this invention is an anhydrous alcohol, the copolymer will be at least 50% esterified by the process of dissolving it. The amount of esterified copolymer to be used may vary from about 0.5 to 5 parts by weight per 100 parts of spray composition.

The resins of this invention should be dissolved in a saturated anhydrous aliphatic alcohol containing from 1 to 4 carbon atoms including methanol, ethanol, propanol, isopropanol and the butanols. The solvent should comprise 25–50 weight percent of the total composition. If an unesterified copolymer is used as a raw material for preparing the spray composition, the amount of solvent alcohol consumed in forming the half ester in situ should be taken into consideration.

If a plasticizer is desired, it should be used in amounts ranging up to 25 parts based on 100 parts of resin. Odorless ester type plasticizers such as the dialkyl phthalates, e.g., dioctyl phthalates, diethyl phthalate, etc., alkyl phthalyl alkyl glycolates, e.g., butyl phthalyl butyl glycolate, etc., adipate, sebacate, etc., esters or mixtures thereof may be used providing they are soluble in the alcohol solvents of this invention.

The aerosol propellant to be used in the compositions is a liquefied gas which exerts a total pressure of from 25–50 lbs./sq. in. at room temperature. It may be one of a number of halogenated hydrocarbons or mixtures thereof chosen to give the desired vapor pressure. The most satisfactory of these compounds are the halogenated alkanes containing 1 to 5 carbon atoms and more particularly fluorine and chlorine substituted methane and ethane including trichlorofluoromethane, dichlorodifluoromethane, trichlorofluoromethane, 1,2-dichloro-1,1,2,2-tetrafluoroethane, etc., or mixtures thereof. Particularly suitable is a 50–50 mixture of trichlorofluoromethane and dichlorodifluoromethane. The amount of propellant depends on the amount of the other ingredients in the composition and should be sufficient to make 100 parts of composition. In general the amount of propellant may range from about 49 to about 74 weight percent of the total composition.

Various conventional additives such as lanolin, nondrying oils, dyes, waxes, pigments, etc., may be added in small amounts to vary the properties of the spray compositions. Lanolin is particularly desirable to help restore the natural condition of the hair. In addition, a small amount of an alcohol soluble perfume may be added for aesthetic appeal.

The compositions of this invention may be sprayed on dry or damp hair to provide a thin transparent film enhancing the natural luster of the hair without imparting to it a lacquered appearance. The deposited films have sufficient strength to keep the hair in place but insufficient to render it stiff. The composition dries quickly to a non-tacky state which does not flake on combing but is easily removed by washing with water and a mild soap or commercial shampoo preparation.

The compositions of this invention are useful in other fields where sprayable film-forming materials which are soluble in mild alkali are needed. For example, they may be colored and used as a sprayable shoe polish which will not be affected by water but which can be removed by soap and water. By proper color formulation, it is possible to use the compositions to make frequent changes in shoe colors. Thus ladies' white shoes can be colored to match one evening gown and then washed and re-colored to match a different gown. For this application other volatile solvents such as acetone, methylethyl ketone, etc. may be used if desired.

The compositions may also be modified by hard and soft waxes to provide floor and automobile finishes.

Many variations may be made in the compositions of this invention without departing from the spirit and scope thereof.

What is claimed is:

1. A composition adapted for use as a hair spray comprising (a) about 0.5–5.0 weight percent of a copolymer of maleic anhydride and an olefin containing 2–4 carbon atoms, said copolymer having a molecular weight of about 25,000–70,000 and being esterified to the extent of 50–70% with a saturated aliphatic alcohol containing from 1–4 carbon atoms, dissolved in (b) about 25–50 weight percent of a solvent consisting of anhydrous saturated aliphatic alcohols containing 1–4 carbon atoms and (c) about 49–74% of a propellant consisting of halogenated alkanes containing 1–5 carbon atoms and being capable of exerting a total pressure of 25–50 p.s.i. at room temperature.

2. A composition adapted for use as a hair spray comprising about 0.5–5.0 weight percent of an ethyl half ester of an ethylene-maleic anhydride copolymer having a molecular weight of 25,000–70,000 dissolved in about 25–50 weight percent of anhydrous ethanol and about 49–74 weight percent of a propellant consisting of a 50:50 mixture by weight of trichlorofluoromethane and dichlorodifluoromethane.

3. A composition adapted for use as a hair spray comprising 0.5–5.0 weight percent of an ethyl half ester of a propylene-maleic anhydride copolymer having a molecular weight of 25,000–70,000, dissolved in about 25–50 weight percent of anhydrous propanol and about 49–74 weight percent of a propellant consisting of a 50:50 mixture by weight of trichlorofluoromethane and dichlorodifluoromethane.

4. A composition as in claim 2 which contains up to 25 parts by weight based on 100 parts by weight of resin of an ester type plasticizer, said plasticizer being soluble in anhydrous aliphatic alcohols containing 1–4 carbon atoms.

5. A composition adapted for use as a hair spray comprising about 1.5 parts by weight of an ethyl half ester of an ethylene-maleic anhydride copolymer having a molecular weight of about 25,000, about 0.25 part by weight of butyl phthalyl butyl glycolate, about 0.3 part by weight of lanolin, about 30 parts by weight of anhydrous ethanol, about 35 parts by weight of trichlorofluoromethane and about 35 parts by weight of dichlorodifluoromethane.

6. A process for producing hair spray compositions which comprises dissolving about 0.5–5.0 weight percent of a copolymer of maleic anhydride and an olefin containing 2–4 carbon atoms and being esterified to the extent of 50–70% with a saturated aliphatic alcohol containing 1–4 carbon atoms, said copolymer having a molecular weight of 25,000–70,000 in about 25–50% of a solvent consisting of anhydrous aliphatic alcohols containing 1–4 carbon atoms and pressurizing the solution to a total pressure of 25–50 p.s.i. when determined at room temperature with a halogenated alkane containing 1–5 carbon atoms.

References Cited in the file of this patent

UNITED STATES PATENTS

| 2,615,845 | Lippincott et al. | Oct. 28, 1952 |
| 2,617,780 | Lutz | Nov. 11, 1952 |
| 2,637,712 | Upton | May 5, 1953 |

FOREIGN PATENTS

| 562,092 | Great Britain | June 19, 1944 |
| 685,048 | Great Britain | Dec. 31, 1952 |